United States Patent [19]
Cho

[11] 4,261,068
[45] Apr. 14, 1981

[54] REINFORCEMENT IN A HONEYCOMB FOUNDATION

[76] Inventor: Young T. Cho, 118-23 83rd Ave., Kew Gardens, N.Y. 11415

[21] Appl. No.: 89,029

[22] Filed: Oct. 29, 1979

[51] Int. Cl.³ .................................. A01K 47/04
[52] U.S. Cl. .................................................. 6/11
[58] Field of Search ................................ 6/10, 11

[56] References Cited
U.S. PATENT DOCUMENTS

| 1,830,592 | 11/1931 | Coddington | 6/11 |
| 2,313,735 | 3/1943 | Dadant et al. | 6/10 |

FOREIGN PATENT DOCUMENTS

| 415651 | 6/1923 | Fed. Rep. of Germany | 6/11 |
| 79600 | 12/1918 | Switzerland | 6/11 |

Primary Examiner—Gene Mancene
Assistant Examiner—Robert P. Swiatek
Attorney, Agent, or Firm—Auslander, Thomas & Morrison

[57] ABSTRACT

A welded wire openwork mesh as a reinforcement for honeycomb foundation in a honeycomb frame provides strength against stretching, sagging, bulging or buckling, and support of honeycomb in the frame allowing rapid centrifuging without breakage.

9 Claims, 7 Drawing Figures

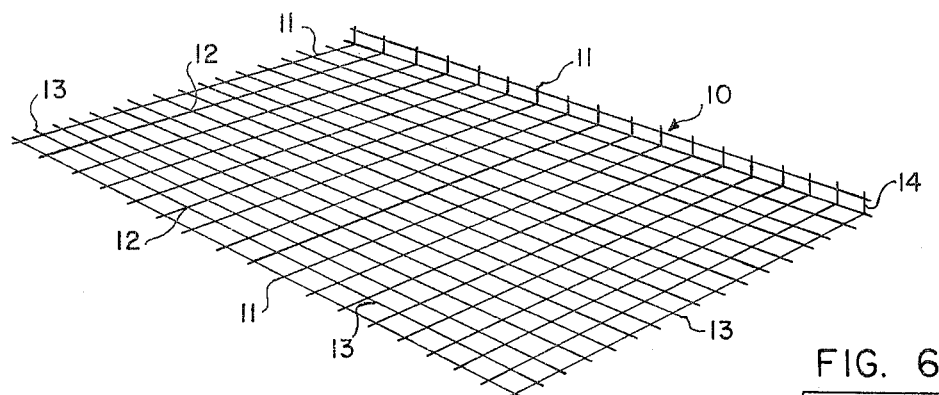
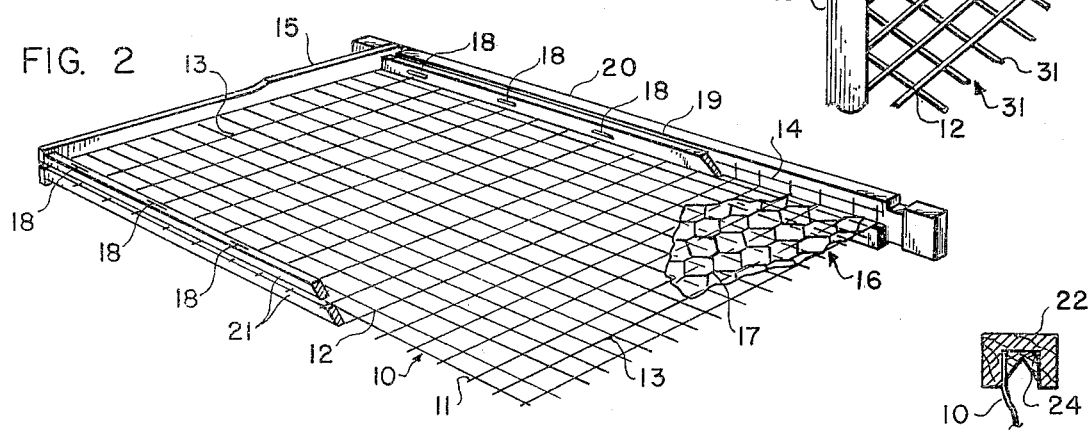
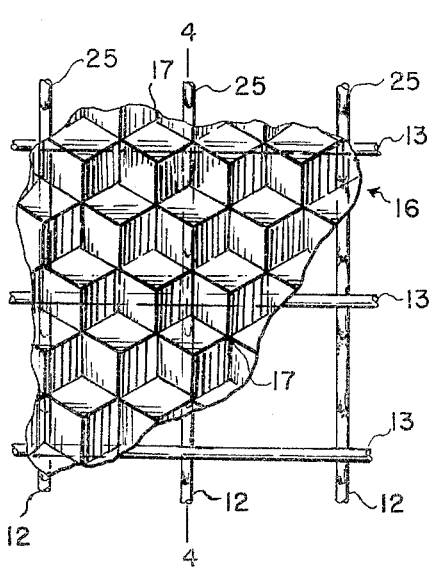
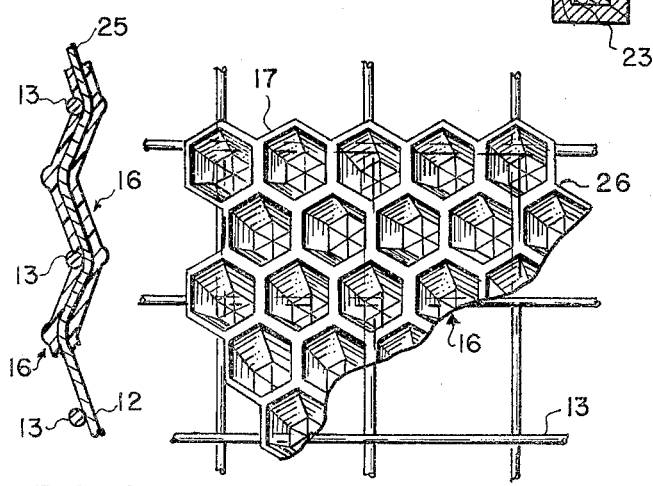

4,261,068

REINFORCEMENT IN A HONEYCOMB FOUNDATION

In beekeeping, removable frames are employed for the brood chamber and extraction chamber of the hives. The frames in which the honeycomb is held are usually provided with a honeycomb foundation of beeswax impressed with the shape of the hexagonal cells to be built on the foundation. It is often desirable to have frames which are interchangeable between the chambers.

Common to both chambers are the problems of stretching, sagging, bulging and buckling, particularly in warm weather.

Extraction of honey poses new sets of problems for the honeycomb and the frame. Extraction is usually done by taking the frames and placing them in centrifugal extractors.

The first step in extraction is uncapping of the cells which are capped when filled by the bees. Once in the extractor, uneven extraction may throw the frame out of balance, breaking the comb. Many irregularities in the extraction process may create an imbalance in the comb, causing breakage or limitation on the speed of extraction.

New comb is brittle, and as such, is limited as to the speed of centrifuging it can be subjected to, irrespective of other difficulties with the comb. Thus, it is often necessary to slow the centrifuge or to sort the frames to match them for their strength in the centrifuge, to get optimum extraction with a minimum of block separation or breakage.

Frames of the past usually have been provided with honeycomb foundation made of beeswax with hexagonal impressions on either side, the size of worker bee cells. (This is particularly true for frames for the brood chamber). The foundation provides a good start for bee cell building on either side of the foundation, but does not solve the above-mentioned basic problems.

Many means have in the past been provided to reinforce honeycomb foundation. Numerous means have been used to provide support for the foundation, such as found in U.S. Pat. No. 1,412,457, where vertically spaced bars were provided in the frame to reinforce the comb.

Reinforcement introduces new set of problems. Bees detecting foreign matter within the foundation tend to gnaw away at the foreign matter, making holes in the comb wherein the reinforcement is. The more foreign matter, the more for bees to attack. Thus, large metal objects such as in U.S. Pat. No. 1,412,457, responsive to outside temperatures, helped make the bees aware of their presence. This is particularly ture in the brood chamber.

Another reinforcement technique has been to supply honeycomb foundation on a rippled plastic sheet. The sheet provided a good deal of support to the comb, but was often attacked by the bees who removed large sections of the foundation which they do not rebuild.

It has been desirable to provide horizontal support to the comb also. This has been done as shown in U.S. Pat. No. 2,276,938 wherein horizontal wires are threaded through the frames. Such horizontal wire are usually laboriously threaded and oftentimes have to be specially heated to embed then in the foundation for grip and to avoid exposure.

Such horizontally threaded support wires, while providing some support, were limited in their ability to prevent the ills of sagging, stretching, bulging and buckling and comb breakup, or block separation under centrifuging conditions.

The present invention is a reinfocement in a honeycomb foundation. The reinforcement is a mesh of welded wires embedded in the normal honeycomb foundation. It has been found that although the bees oftentimes attack the reinforcement of the present invention and gnaw away part of the foundation, that they rebuild after gnawing, and proceed to make good honeycomb. It is always desirable to have a maximum of strength in reinforcement with a minimum of physical foreign matter in the honeycomb foundation.

The reinforcement of the present invention is an openwork mesh of crossed wires in optional mesh sizes. In a preferred embodiment, the wires cross at right angles, forming a mesh of approximately one half, one inch, two inches, and up to four inches or more. The gauge of the wire preferably ranges from twenty gauge to about twenty-eight gauge. The wire may be straight or corrugated. It is preferable to have the vertical strands corrugated, since the corrugations tend to follow the pattern of the cell structure and the foundation, which usually is provided with hexagonal impressions. The corrugations tend also to hold the wax in position. The horizontal strands are usually straight. Stainless steel is an excellent wire for the reinforcement, although wires, such as plain steel, or even copper, may be employed.

The strands of the wire are welded to their cross joints. In a preferred embodiment, the strands are overlain and welded at these cross joints. An interweaving of the welded wires also achieves the objectives of the present invention, but is more complicated to fabricate.

Mesh of the present invention supports filled honeycomb, even when the heat inside the hive exceeds the melting point of beeswax. Thus, when the hive cools, such as at night, the comb is maintained with little, if any, distortion.

Heat on prior art reinforcement has caused buckling and other problems in the comb because of the expansion of the reinforcement. The welding at the cross joints of the reinforcement of the present invention distributes the expansion and restricts it, avoiding much of the difficulties of the past.

In centrifuging honeycomb on the frames where the reinforcement has formed a base for the honeycomb, the comb is uniformly firmly held without breakage, particularly block separation, even where the comb may be unbalanced or uneven in the uncapping, or where there are capped cells, cells with granular honey, or pollen cells, which often promotes difficulties in centrifuging.

Foundation reinforced with the reinforcement of the present invention may be centrifuged at high speeds without breakage of the comb, or block separation, and the frames do not have to be sorted and matched to be placed in the centrifuge as in the past.

According to the present invention, a welded wire mesh reinforcement is provided in honeycomb foundation which supports the honeycomb in the frame in the hive against sagging, stretching, bulging and buckling, and which supports honeycomb in the frame against breakage in centrifuging. In a preferred embodiment, the reinforcement is formed of crossing sets of spaced wires substantially parallel to each other on a flat plane formed in an openwork mesh with the cross joints forming the welded mesh.

The reinforcement may be bent to form a hook for engaging in some honeycomb frames, or may be engaged flat.

In a preferred embodiment, the reinforcement wires are of stainless steel, although other metals such as steel or copper are also satisfactory.

Corrugated vertical wires are effective in one embodiment, particularly to help prevent slippage or honeycomb on the reinforcement when heat in the hive is over the melting point of wax.

In another embodiment of the present invention, the wires of the reinforcement may be engaged to fill the honeycomb to the sides of the frame.

Although such novel feature of features believed to be characteristic of the invention are pointed out in the claims, the invention and the manner in which it may be carried out may be further understood by reference to the description following and the accompanying drawings.

FIG. 1 is an isometric view of the honeycomb foundation reinforcement of the present invention.

FIG. 2 is a detail isometric view of reinforcement of the present invention in a honeycomb foundation in a frame with the honeycomb partially cut away.

FIG. 2a is a cross section of an alternate mode of holding the honeycomb foundation of the present invention in a frame.

FIG. 3 is a partial detail of the reinforcement of the present invention embedded in a honeycomb foundation.

FIG. 4 is a side elevation of FIG. 3.

FIG. 5 is a plan view of drawn-out comb built on a foundation reinforced by the present invention.

FIG. 6 is a detail of an alternate embodiment of the reinforcement of the present invention for honeycomb foundation.

Referring now to the figures in greater detail, where like reference numbers denote like parts in the various figures.

The honeycomb foundation reinforcement 10 as shown in FIG. 1 is an openwork mesh of wire strands 11, welded at their cross joints 12 to the horizontal strands 13. The honeycomb foundation reinforcement 10 as shown in FIG. 1, is provided with an optional hook 14 for being engaged in a honeycomb frame 15 as shown in FIG. 2.

As shown in FIG. 2, the honeycomb foundation reinforcement 10 is embedded in the honeycomb foundation 16, which includes hexagonal impression of cell 17 impressed in the beeswax of the honeycomb foundation 16. The foundation 16 with the honeycomb foundation reinforcement 10 is fixed to the frame 15 by using staples 18 through the wedge 19 of the top bar 20 of the frame 15. The staples 18 firmly engage the hook 14 of the honeycomb foundation reinforcement 10. In the frame 15 as shown in FIG. 2, the bottom bar 21 is a split bar. The honeycomb foundation reinforcement 10 is fixed to the bottom bar 21 with staples 18 passing through the honeycomb foundation reinforcement 10 with the foundation 16.

There are various types of honeycomb frames and modes of attachment of the foundation 16 and the honeycomb foundations reinforcement 10. In FIG. 2a, a section of a grooved top bar 22 and grooved bottom bar 23 are shown, engaging a honeycomb foundation reinforcement 10 without a hook 14, where the honeycomb foundation reinforcement 10 and foundation 16 are engaged by wedges 24.

In another preferred embodiment of the present invention, as shown in FIGS. 3 and 4, corrugated vertical strands 25 are employed. The corrugations in the strands 25 tend to follow the ripples of the cell 17. The corrugations also provide a better grasp of the foundation 16 into which it is embedded.

As can be seen in FIG. 4, it is preferable for the honeycomb reinforcement 10 to be fully embedded in the foundation 16.

Once the frames 15 are in place in a hive, the bees build the honeycomb 26 on the foundation 16. Once the honeycomb 26 is built, it is filled with honey or pollen, and used also in the brood chamber for breeding bees for the hive.

The honeycomb 26 is capped by the bees. In extraction, the caps are mechanically sheared off and the frames 15 centrifuged to obtain the honey. In FIG. 5, uncapped honeycomb 26 is shown after the honey has been drawn out by centrifuge.

In FIG. 6, an alternate configuration of honeycomb foundation reinforcement 30 is shown where the strands 31 do not cross each other at right angles.

The honeycomb foundation reinforcement 10 preferably comprises a straight overlay of horizontal strands 13 over vertical strands 11, welded at each cross joint 12. An over-under welded configuration of strands 11, 13 would function but would entail more labor for its construction and would not lie as flat as the honeycomb foundation reinforcement 10. Thus, there would be more of a likelihood of bare wire being exposed.

Bees tend to attack all foreign substances in the foundation 16 by gnawing it, particularly in the frames 15 that are in the brood chamber of a hive.

It has been found that although honeycomb foundation reinforcement 10 of the present invention is ofted exposed or attacked by the bees, once it has been gnawed at, it is usually rebuilt over, with little or no loss of honeycomb 26, in the frame 15.

The strands 11, 13, 31 are preferably of stainless steel. Stainless steel has great strength and lasts a long time. Ordinary steel wires have been used and are satisfactory. Copper wire will also work. Wire of approximately twenty gauge to twenty-eight gauge has proven satisfactory as to strength and without providing unnecessary bulk.

The mesh may be optionally from approximately one half inch to over four inches. The meshes between one half and two inches have been found preferable. The smaller the mesh the more cells of the honeycomb 26 are strongly supported. A balance between the structure of the honeycomb foundation reinforcement 10 and foreign matter in the foundation 16 and cells to be supported and cost must be optionally selected by the beekeeper.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. In a honeycomb foundation a reinforcement, said reinforcement including a plurality of wires, said wires arranged in sets, and sets including a first set of substantially parallel wires on a substantially flat plane, a second set of substantially parallel wires on a substantially flat plane overlying said first set, said first and second sets of wires crossing each other in the form of an openwork mesh, and at least a majority of said wires welded to each other at their cross joints, said openwork mesh adapted to firmly hold honeycomb in a honeycomb frame.

2. The invention of claim 1 wherein said wire is steel wire.

3. The invention of claim 1 wherein said wire is stainless steel

4. The invention of claim 1 wherein said wire is of a thickness from approximately twenty to twenty-eight gauge.

5. The invention of claim 1 wherein said wires in said sets are spaced approximately between one half to four inches from each other.

6. The invention of claim 1 wherein said wire if formable and includes at least a bend edge attachable to said honeycomb frame.

7. The invention of claim 1 including corrugated wires in at least one of said wire sets.

8. The invention of claim 7 wherein said corrugated wires are in one set and said set is substantially vertical when in said honeycomb frame.

9. The invention of claim 1 wherein at least one wire set is not parallel to the sides of said honeycomb frame when engaged in said honeycomb frame.

* * * * *